United States Patent
Xu et al.

(10) Patent No.: US 12,174,675 B2
(45) Date of Patent: Dec. 24, 2024

(54) HOLDING DEVICES FOR COMPUTING COMPONENTS

(71) Applicant: Hewlett-Packard Development Company, L.P., Spring, TX (US)

(72) Inventors: Bangzhong Xu, Shanghai (CN); Chun Wei Kuo, Taipei (TW); Cheng-Liang Gong, Shanghai (CN); Chien Hao Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 179 days.

(21) Appl. No.: 17/779,375

(22) PCT Filed: Nov. 26, 2019

(86) PCT No.: PCT/US2019/063276
§ 371 (c)(1),
(2) Date: May 24, 2022

(87) PCT Pub. No.: WO2021/107928
PCT Pub. Date: Jun. 3, 2021

(65) Prior Publication Data
US 2022/0404880 A1  Dec. 22, 2022

(51) Int. Cl.
*G06F 1/18*  (2006.01)
(52) U.S. Cl.
CPC .................. *G06F 1/185* (2013.01)
(58) Field of Classification Search
CPC ........... G06F 1/185; G06F 1/186; G06F 1/183
See application file for complete search history.

(56) References Cited

U.S. PATENT DOCUMENTS

| | | | | |
|---|---|---|---|---|
| 5,623,396 A | * | 4/1997 | Blackwell | H05K 7/1405 361/801 |
| 5,909,359 A | * | 6/1999 | Summers | H05K 7/1429 206/706 |
| 6,409,518 B1 | * | 6/2002 | Hung | G06F 1/186 361/801 |

(Continued)

FOREIGN PATENT DOCUMENTS

| | | |
|---|---|---|
| JP | 10-123618 A | 5/1998 |
| JP | 2018-176368 A | 11/2018 |

(Continued)

OTHER PUBLICATIONS

Barrowch, "Barrowch independent graphics card bracket adjustable aluminum alloy bracket," retrieved on Sep. 30, 2019, 10 pages.

*Primary Examiner* — James Wu
(74) *Attorney, Agent, or Firm* — Quarles & Brady LLP (57) ABSTRACT

A holding device for retaining an installable component in a chassis of a computing device may includes a longitudinally extending first arm, and a movably coupled second arm. The holding device may further include a first engaging portion at first end of the holding device, and a second engaging portion at the second end of the holding device. The engaging portions may couple the holding device to the chassis of the computing device. Furthermore, the holding device may comprise a gripping member. The gripping member is to securely retain the installable component within the chassis of the computing device, and is movable across the length of the holding device.

19 Claims, 4 Drawing Sheets

(56) References Cited

U.S. PATENT DOCUMENTS

| | | | |
|---|---|---|---|
| 6,442,037 B1 * | 8/2002 | Boe ..................... | H05K 7/1408 |
| | | | 361/801 |
| 6,885,565 B2 * | 4/2005 | Shi ......................... | G06F 1/186 |
| | | | 361/801 |
| 7,894,186 B2 | 2/2011 | Farrow et al. | |
| 7,933,129 B2 | 4/2011 | Chen | |
| 9,653,124 B2 | 5/2017 | Heyd et al. | |
| 9,765,924 B2 | 9/2017 | Chi et al. | |
| 11,239,607 B2 * | 2/2022 | Chang .................. | H05K 7/1405 |

FOREIGN PATENT DOCUMENTS

| | | | |
|---|---|---|---|
| JP | 2019-164836 A | | 9/2019 |
| KR | 10-2016-0000456 U | | 2/2016 |
| KR | 10-2017-0083880 A | | 7/2017 |
| KR | 20170083880 | * | 7/2017 |

* cited by examiner

HOLDING DEVICES FOR COMPUTING COMPONENTS

BACKGROUND

Within a computing device, functions pertaining to graphical processing are performed by a graphical processing unit, referred to as a GPU. In some cases, a user may wish to enhance the graphical processing capabilities of a standalone computing device. To this end, an additional graphical processing unit, such as a discrete graphical processing unit (discrete GPU) or a graphics adapter, may be installed within the housing of the computing device.

BRIEF DESCRIPTION OF DRAWINGS

The following detailed description references the drawings, wherein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A standalone personal computing device may include a display monitor and a plurality of input devices which are coupled to a casing or housing. The housing encloses a motherboard and a processor. The housing of the computing device may be of varying sizes depending on the number of components that may be installed in the computing device. In addition, the housing may further enclose additional components and circuitry which may be responsible for performing operations of the computing device and for affecting processing related functions. It may be noted that the graphical processing of such a computing device, in addition to certain other processing functions, may be managed by the processor.

In certain cases, a user may wish to enhance the graphical processing capabilities of the computing device. To enhance the graphical processing capabilities, additional graphics adapters may be installed onto the motherboard of the computing device. For example, a graphics adapter may be installed within a housing of the computing device, by fitting the graphics adapter into a Peripheral Component Interconnect Express (PCIe) slot provided onto the motherboard. Such an option may be exercised by the user in cases where the user utilizes the computing device for high-end graphical functions, or for playing games which support high-end graphics and high resolutions.

Graphics adapters have dedicated circuitry, memory and heat dissipating systems, which are provided onto the circuit board forming the graphics adapters. The circuitry of the graphics adapters may interface with the motherboard through appropriate interfaces. An increase in high-end graphics supported by computer games has resulted in an increase in the processing power of the graphics adapters. This has led to development of graphics adapters which are large in size and weight.

The increase in size and weight of the graphics adapters also poses certain challenges when the graphics adapters are to be installed within the housing. The housing may further include a chassis. A chassis may be a structural frame onto which the components may be mounted. The chassis may be further provided with a plurality of cover panels to form the housing of the computing device. The graphics adapters, similar to other components, may be attached to a chassis of the computing device. For larger graphics adapters, the point on the chassis at which the graphics adapter is attached may experience greater loads and may be prone to stresses due to the weight and the size of the graphics adapter in certain circumstances. For example, slight disturbance, such as those experienced during transportation or repositioning of the housing, may tend to vibrate or move the graphics adapter making it prone to damage.

Furthermore, the movement of the graphics adapter may also result in undesirable changes to the slot on the motherboard into which the graphics adapter is coupled. In the event that the slot of the motherboard becomes defective, it may result in failure in detecting the graphics adapter at the time of start-up. In certain other cases, graphics adapters may also include heat sinks or may be further coupled to other heat dissipating mechanisms, the efficiency of which may be impacted if the graphics adapter is to move. It may therefore be gathered that support provided by the chassis of the computing device may not be sufficient to prevent damage either to the graphics adapter or to the slots provided on the motherboard of the computing device.

The graphics adapters installed within the housing of the computing device may be supported through additional supports or holders. However, such holders may not be suitable for different graphics adapter of varying sizes or for housings of different sizes. In certain cases, space available within the housing may not be sufficient to accommodate such holding devices.

Examples of a holding device for a graphics adapter are described. The holding device is to securely hold and maintain the position of the graphics adapter installed within the housing of the computing device. The holding device may be mounted to a chassis of the computer. Such an arrangement avoids damage to the graphics adapter when the housing (within which the graphics adapter is installed) is moved. The present example may also reduce the possibility of structural failure of graphics adapter owing to its weight and may also reduce the possibility of damage to the slots of the motherboard onto which the graphics adapter may be mounted.

In an example, the holding device comprises a first arm and a second arm, with the second arm being coupled to the first arm. The first arm and the second arm are longitudinally moveable with respect to each other. As a result, the first arm and the second arm may longitudinally extend or retract to change the length of the holding device. In an example, the length of the holding device may be adjusted so that it conforms to the length of the chassis in which the holding device is to be installed.

In an example, the holding device further includes a gripping member which is movably coupled to either the first arm or the second arm. The gripping member is moveable along the length of the holding device and may be suitably positioned along the length of the holding device at any position. The positioning of the gripping member may be based on the dimensions of the graphics adapter to be supported. Once a target position of the gripping member is set, the gripping member may be secured onto the holding device through a coupling member. The gripping member is to grip and hold the graphics adapter when it is installed onto a motherboard of the computing device. In an example, the gripping member may be decoupled and fastened at the target position along the length of the holding device.

The gripping member is such that it provides a resilient support but without exerting any excessive gripping forces onto the graphics adapter. As a result, the graphics adapter may be accommodated with minimal efforts without compromising the extent of support when the graphics adapter is installed onto the motherboard. In an example, the gripping member may be manufactured using flexible material to accommodate and hold the graphics adapter of various shape and geometries.

In another example, the holding device may be rigidly attached to the inner surface of the front wall and the back wall of the housing. To this end, the holding device comprises a first engaging portion and a second engaging portion. The first engaging portion and the second engaging portion are provided on the opposite ends of the holding device, and may be used for rigidly attaching the holding device to the inner surfaces of the housing. It may be noted that the rigid support on either ends of the holding device provides additional structural support for the graphics adapter, which is installed within the computing device. It may be noted that the holding device as described may include certain structural elements which may differ between various examples. These and other examples are provided in further detail in conjunction with FIGS. 1-4.

Figure 1:
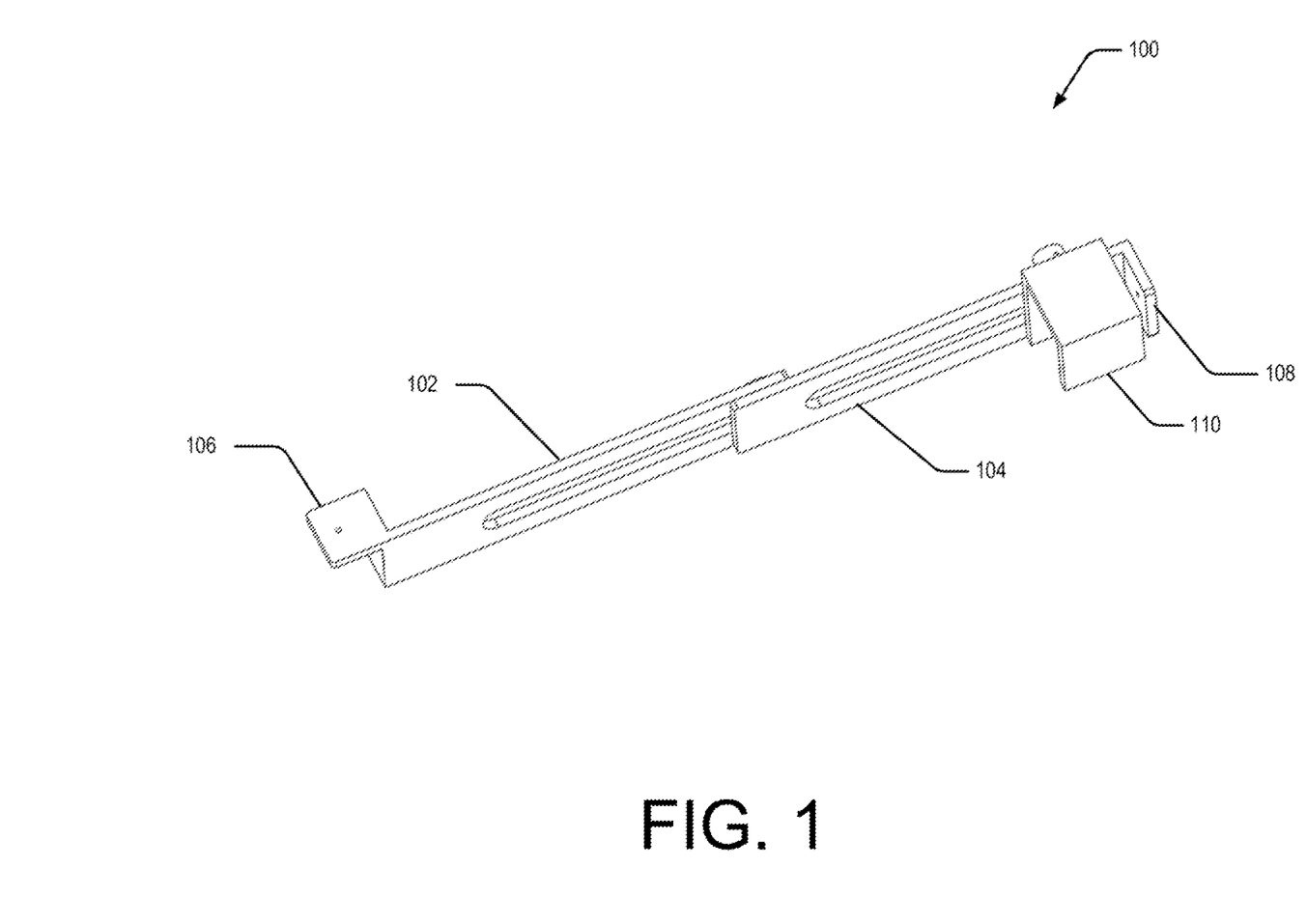
FIG. 1 illustrates a perspective view of an example holding device for securely holding a graphics adapter within a housing of a computing device.

FIG. 1 depicts a perspective view of an example holding device 100 for supporting a graphics adapter installed within a computing device (not shown in FIG. 1). The holding device 100 comprises a first arm 102 and a second arm 104. In the example as illustrated, the second arm 104 is coupled to the first arm 102. Furthermore, the second arm 104 extends and moves in a direction along the length of, and relative to, the first arm 102. The holding device 100 further includes a first engaging portion 106 which is provided at a first end of the holding device 100. In one example, the first end of the holding device 100 may be one end of the first arm 102. The arrangement is such that it permits the first engaging portion 106 to attach the first end of the holding device 100 to an inner wall of the chassis of the computing device.

The holding device 100 may further include a second engaging portion 108 provided at a second end of the holding device 100. In an example, the second end of the holding device 100 may be an end of the second arm 104 which is distal to the first end. The arrangement is such that the engaging portion 108 is to permit the second end of the holding device 100 to be attached to the chassis of the computing device. Continuing with the present example, the holding device 100 may further comprise a gripping member 110. In an example, the gripping member 110 is movably coupled to one of the first arm 102 and the second arm 104. As a result of the coupling, the gripping member 110 may move along the length of the holding device 100. In an example, the gripping member 110 may be fixed at a certain position along the length of the holding device 100. Once fixed, the gripping member 110 is to retain an installable component within the chassis of the computing device. An example of such an installable component includes, but is not limited to, a graphics adapter. It may be noted that other types of installable components may be supported by the holding device 100 without deviating from the scope of the present subject matter.

The holding device 100 may be fitted inside the computing device such that it extends along the length of the chassis of such a computing device. In such an example, the first engaging portion 106 may be rigidly attached to an inner surface of a front wall of the chassis. In a similar manner, the second engaging portion 108 may be rigidly attached to a back wall of the chassis of the computing device. The rigid connection with the inner walls of the chassis provide sufficient structural support to handle varying loads of different types of graphics adapters.

Figure 2:
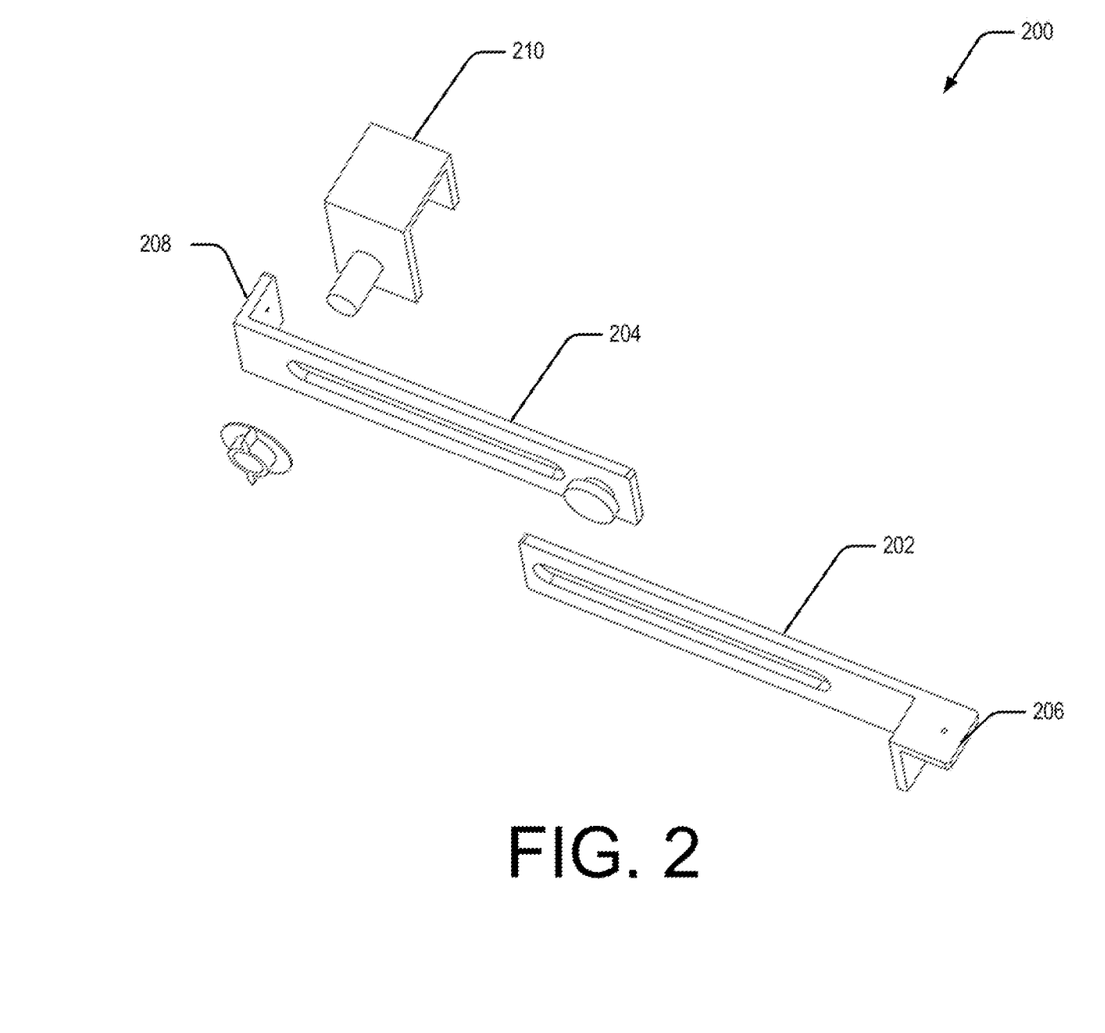
FIG. 2 illustrates a perspective and exploded view of an example holding device for securely holding a graphics adapter within a housing of a computing device.

FIG. 2 illustrates an exploded perspective view of holding device 200 as per one example of the present subject matter. Similar to the holding device 100, the holding device 200 comprises a first arm 202 coupled to a second arm 204. In an example, the first arm 202 and the second arm 204 are coupled through a notched element. The coupling of the first arm 202 and the second arm 204 is such that both the first arm 202 and the second arm 204 are moveable in a direction along the length of the holding device 200. In the example as illustrated, the opposite ends of the holding device 200 are provided with a first engaging portion 206 (provided on a first end of the holding device 200) and second engaging portion 208 (provided on a second end of the holding device 200). It may be noted that the second end may be a distal end of the second arm 204 with respect to the first end of the holding device 100. The first engaging portion 206 and the second engaging portion 208 are to allow the holding device 200 to be rigidly attached to the inner walls of the chassis of a computing device.

For providing the support to the graphics adapter, the first arm 202 and the second arm 204 may be moved apart such that the resulting length of the holding device 200 may conform with the dimensions of the housing. In an example, the first arm 202 and the second arm 204 of the holding device 200 may be extended such that the holding device 200 (in its extended form) is able to be accommodated within the space between the inner walls of the chassis of the computing device. Once a certain length of the holding device 200 is achieved, the first engaging portion 206 and the second engaging portion 208 may be rigidly attached to the corresponding walls of the chassis of the computing device. It may be noted that the first engaging portion 206 and the second engaging portion 208 allow the holding device 200 to be supported at both ends. This further reduces the possibility of the holding device 200 bending due to the weight of the graphics adapter installed within the computing device.

The holding device 200 may further comprise a gripping member 210 which is detachably coupled with the holding device 200. In an example, the gripping member 210 may be detachably coupled to either the first arm 202 or the second arm 204. Depending on the size and dimension of the graphics adapter which is to be supported, an appropriate position of the gripping member 210 along the holding device 200 may be identified. Once the target position is identified, the gripping member 210 may be positioned accordingly and secured at the target position. In instances where a user wishes to change or replace the installed graphics adapter with another graphics adapter, the gripping member 210 may be unsecured and then detached from the holding device 200. Another target position may be determined, and accordingly, the gripping member 210 may be re-positioned and then secured. The repositioning of the gripping member 210 may be performed without detaching the first engaging portion 206 and the second engaging portion 208 from the inner walls of the chassis of the computing device.

Figure 3:
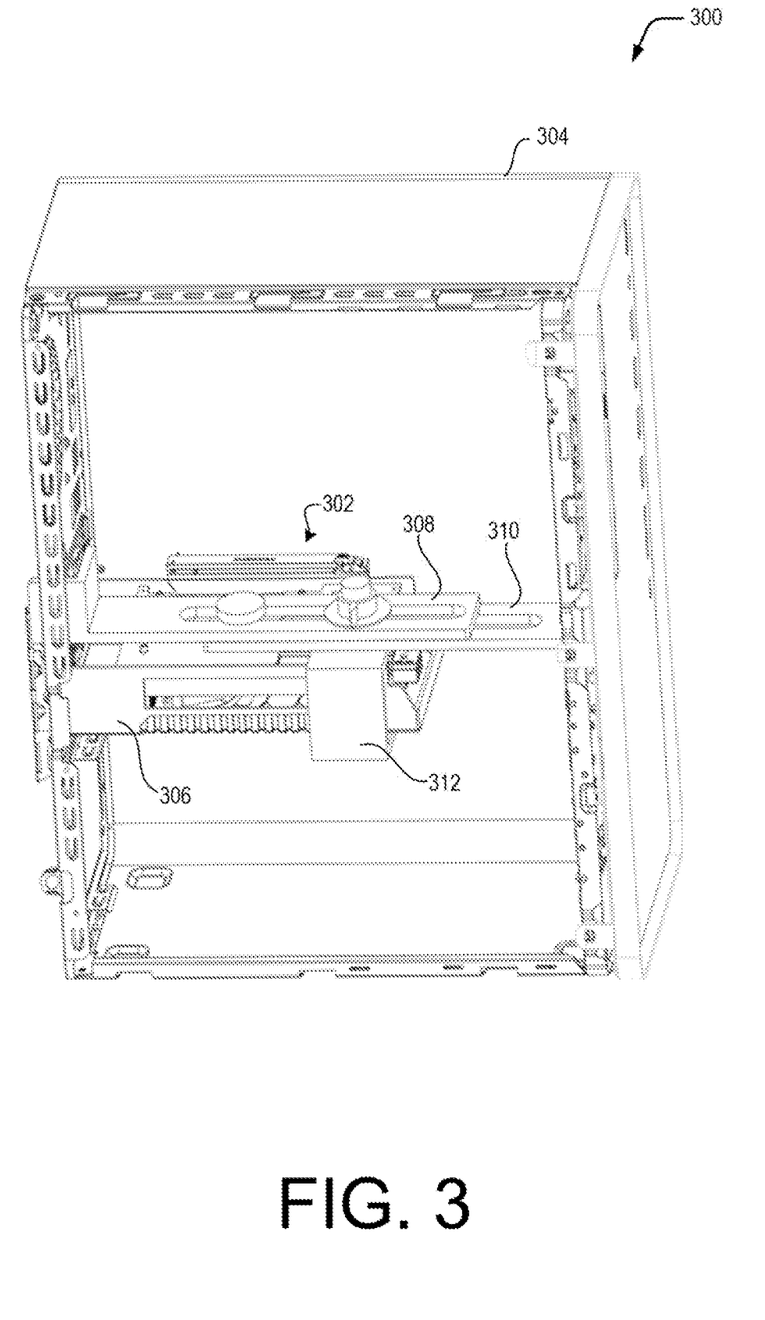
FIG. 3 illustrates a perspective view of a computing device housing implementing an example holding device according to the present subject matter.

FIG. 3 illustrates a housing of an exemplary computing device 300 which is further fitted with a holding device 302, according to one example of the present subject matter. The housing of computing device 300 may further include a chassis 304 to which the holding device 302 may be rigidly attached when installed within the computing device 300. In an example, the chassis 304 chassis may be a structural frame onto which components of the computing device 300, may be mounted. The holding device 302 when installed within the computing device 300 is to hold and support an installable component 306 which may be coupled to a motherboard (not shown in FIG. 3) of the computing device 300 and may prevent any ensuing damage that may occur either to the installable component 306 or the slots in the motherboard within which the installable component 306 is installed.

Returning to the holding device 302, the holding device 302 may further comprise a first arm 308 and a second arm 310. The first arm 308 and the second arm 310 are coupled to each other. The coupling of the first arm 308 and the second arm 310 is such that it is to permit the movement of the second arm 310 along the direction in which the first arm 308 extends. The second arm 310 may also extend relative to the first arm 308 such that the length of the holding device 302 may be adapted as per the dimensions of the chassis 304.

The holding device 302 may further comprise a gripping member 312, wherein the gripping member is to securely grip the graphics adapter 306 while it is installed within the computing device 300. In an example, the gripping member 312 is coupled to the first arm 308 of the holding device 302. In another example, the gripping member 312 may be moveable along the length of the second arm 310 and may be positioned at any point depending on the dimensions of the installable component 306. When positioned at the appropriate position along the holding device 302, the gripping member 312 may be secured such that it is fixed at the target position. In an example, the installable component 306 includes, but is not limited to, a graphics adapter.

Figure 4:
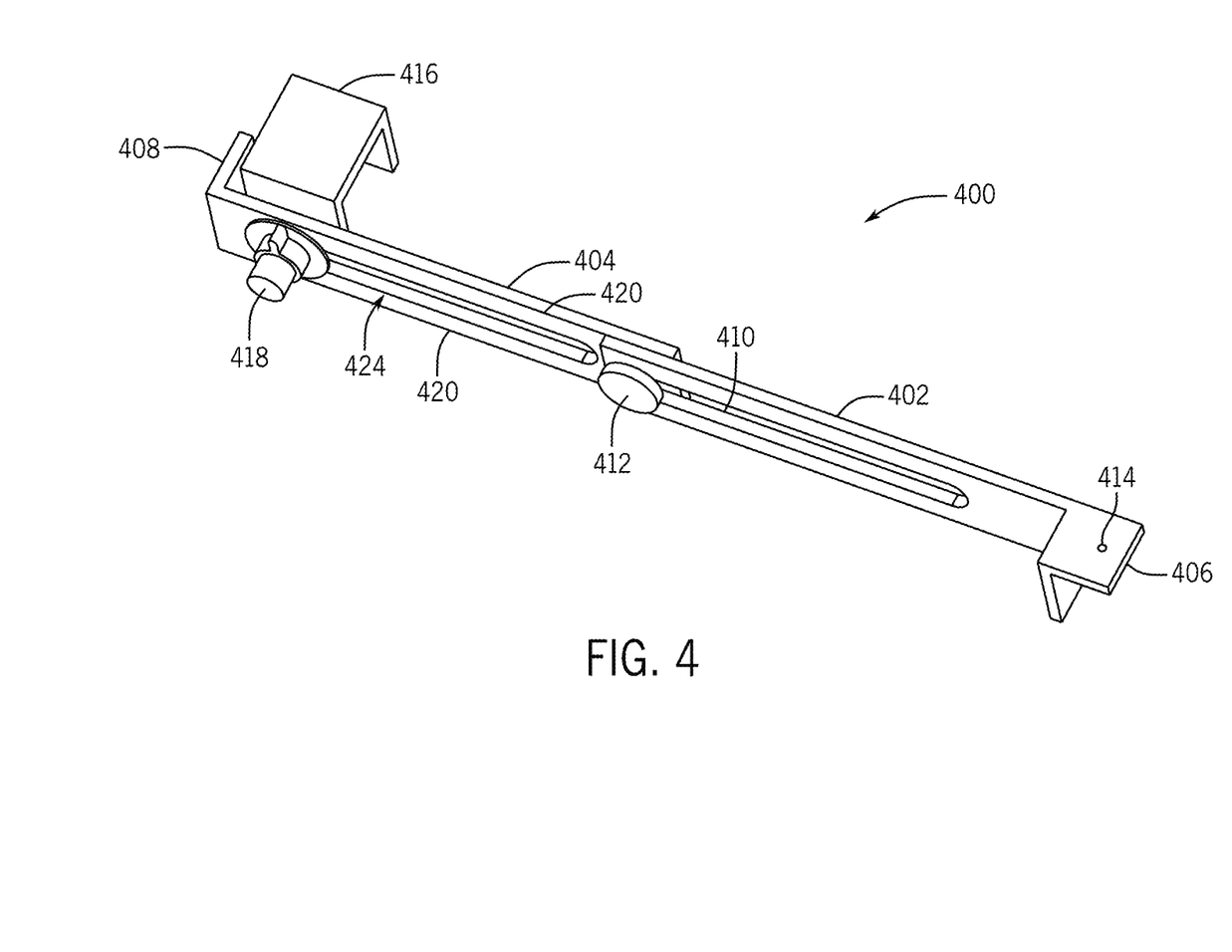
FIG. 4 illustrates a detailed perspective view of an example holding device for securely holding a graphics adapter within a housing of a computing device.

FIG. 4 illustrates another perspective view of the holding device 400, as per one example of the present subject matter. In the example as illustrated, the holding device 400 includes a longitudinally extending first arm 402. The holding device 400 may further include a second arm 404, which is movable with respect to the first arm 402. The movement of the second arm 404 is such that it moves in a direction which extends along the length of the first arm 402. In an example, the second arm 404 slides along the length of the first arm 402. As would be noted, the movement of the second arm 404 with respect to the first arm 402 results in a change in an effective length of the holding device 400. For example, the second arm 404 when slid in a direction towards the first arm 402, the effective length of the holding device 400 decreases. In a similar manner, when the second arm 404 is extended and moves in a direction away from the first arm 402, the effective length of the holding device 400 increases. Accordingly, the length of the holding device 400 may be modified by manually moving the second arm 404 relative to the first arm 402 in order to either increase or decrease the effective length of the holding device 400. In an example, the first arm 402 moves in a plane which is offset with respect to another plane in which the second arm 404 is to move. The offset is such that it allows the first arm 402 to slide along the surface of the second arm 404 when the first arm 402 and the second arm 404 are either extended or retracted, with respect to each other.

Continuing further, the holding device 400 may include a first engaging portion 406 (provided on a first end of the holding device 400) and second engaging portion 408 (provided on a second end of the holding device 400). In one example, the second end is an end of the second arm 404 which is farthest from the first end. The first engaging portion 406 and the second engaging portion 408 are to allow the holding device 400 to be rigidly attached to the inner walls of the chassis of a computing device. When both the first engaging portion 406 and the second engaging portion 408 are attached to the inner walls of the chassis, the holding device 400 is supported at both of its ends. The support provided at the first engaging portion 406 and the second engaging portion 408 provides a suitable support throughout the length of the holding device 400. This reduces the possibility of deformation of the holding device 400 which may occur over a period of time, owing to the weight of the installable component, such as the installable component 306.

Continuing with the present example, the location within the housing of the computing device (e.g., the computing device 300) where one of the first engaging portion 406 and the second engaging portion 408 are to be fixed, may be based on the orientation and position of the installable component (which may be a graphics adapter) which is to be installed within the computing device. The housing of the computing device may have certain dimensions specified by its height, width, and length. In an example, the motherboard of the computing device may be located along an inner wall which extends along the length of the housing. As a result, the graphics adapter, when installed, may be so oriented such that it may extend orthogonally with respect to the motherboard but may be parallel to a lower bottom surface of the housing. To support such a graphics adapter, in an example, the first engaging portion 406 of the holding device 400 may be fixed to an inner wall of a front portion of the housing, while the second engaging portion 408 may be attached to an inner wall of a rear portion of the housing.

As described above, the first arm 402 and the second arm 404 are coupled to each other. In an example, the coupling of the first arm 402 and the second arm 404 prevents the second arm 404 to be removed or disassociated from the first arm 402. In an example, the first arm 402 may be provided with a tracking section 410 which extends along the planar surface of the first arm 402. The second arm 404 on the other hand may be provided with a notched element 412. The notched element 412 as illustrated has broad top portion with a narrower neck portion. The width of the top portion is greater than the broadest width of the tracking section 410. The width of the neck portion is such that it is less than the width of the tracking section 410.

When the second arm 404 moves with respect to the first arm 402, the notched element 412 provided thereupon moves along the tracking section 410. Owing to the broader width of the top portion of the notched element 412, the second arm 404 remains engaged and coupled with the first arm 402. In an example, the first arm 402 and the second arm 404 may be provided with additional guiding elements or guide rails 420 to define the path of the second arm 404 as it moves with respect to the first arm 402. For example, the guide rails 420 may define a thru-channel 424 to guide movement of the second arm 404 as it moves with respect to the first arm 402. In an example, the first arm 402 may also be provided with an additional notched element (not shown in FIG. 4) which in turn may engage with a complimentary tracking section provided in the second arm 404. In another example, the tracking section 410 may be further provided with a series of sectioned grooves, through which the notched element 412 moves when the first arm 402 and the second arm 404 are to move relative to each other.

Continuing with the present example, first engaging portion 406 may be provided with through holes 414. The through holes 414 allow the first engaging portion 406 to be rigidly attached through fasteners. Examples of such fasteners include, but are not limited to, screws, nuts, and bolts, or other suitable mechanical fasteners. The second engaging portion 408 may be affixed to the chassis of the computing device in a similar manner, in some examples.

The holding device 400 may further include a gripping member 416. The gripping member 416 is coupled to the second arm 404. In an example, the gripping member 416 is movable along the length of the second arm 404 onto which it is fixed. Depending on the size and dimensions of the graphics adapter which is to be supported, an appropriate position along the second arm 404 of holding device 400 may be identified. Once the target position is identified, the gripping member 416 may be positioned accordingly and secured at the target position.

There may be cases where a user may wish to replace an already installed graphics adapter. In such instances, the gripping member 416 may be unsecured and then detached from the holding device 400. Another target position may be determined and the gripping member 416 may be positioned and secured accordingly. The repositioning of the gripping member 416 may be performed without detaching the first engaging portion 406 and the second engaging portion 408 from the inner walls of the chassis of the computing device.

In an example, the movement and positioning of the gripping member 416 may be controlled through a coupling member 418. The coupling member 418 may be manually actuated to fix the position of the gripping member 416 at any point which may lie along the second arm 404. When the coupling member 418 is not actuated, the gripping member 416 is freely movable along the length of the second arm 404. In another example, the coupling member 418 may also permit the decoupling of the gripping member 416 from the second arm 404. In such a case, the gripping member 416 may be detached from the second arm 404 and may be positioned at any point along the first arm 402 without any deviation from the scope of the present subject matter. In some examples, the coupling member 418 may be a threaded post. To secure the gripping member 416 to the second arm 404, the gripping member 416 is attached to the threaded post which may then be inserted through the tracking section 410. Once inserted, the threaded post (and in turn the gripping member 416) is secured to the second arm 404 using a complimentary nut or a wing nut. In an example, the gripping member 416 may be positioned at any point along the length of the second arm 404 before the threaded post is secured by the complimentary nut. In another example, the coupling member 418 may be a threaded stud.

Returning to the gripping member 416, the gripping member 416 may have an inner profile that may be adapted for accommodating the shape of the installable component, such as the graphics adapter 306, when it is installed within the computing device. The gripping member is such that it provides a resilient support but without exerting any excessive gripping forces which may cause damage to the graphics adapter during installation. In an example, the gripping member 416 may be manufactured using flexible material to accommodate and hold the graphics adapter of various shape and geometries, and to avoid any resulting damaging to the pins of the graphics adapter in case the housing is moved or disturbed. In one example, the inner profile of the gripping member 416 may be U-shaped for gripping the graphics adapter. In another example, the inner portion of the gripping member 416 may have a profile which is adapted to receive and accommodate graphics adapters of varying shapes. In an example, the gripping member 416 may be manufactured from a flexible material which allows the graphics adapter 306 to be installed within the computing device. Examples of such material include, but is not limited to, rubber or other flexible polymer-based materials.

Although examples for the present disclosure have been described in language specific to structural features and/or methods, it may be understood that the appended claims are not necessarily limited to the specific features or methods described. Rather, the specific features and methods are disclosed and explained as examples of the present disclosure.

We claim:

1. A holding device, comprising:
 a longitudinally extending first arm, the first arm including a tracking section that defines a first channel extending through a thickness of the first arm;
 a second arm coupled to the first arm, wherein the second arm extends and moves in a direction parallel to the first arm, and wherein the second arm includes a set of guide rails defining a second channel extending though a thickness of the second arm to guide movement of the second arm parallel to the first arm;
 a first engaging portion at a first end of the holding device, wherein the first engaging portion is to attach to a chassis of a computing device;
 a second engaging portion at second end of the holding device, the second end distal to the first end, wherein the second engaging portion is to attach to the chassis of the computing device; and
 a gripping member coupled to one of the first arm and the second arm, wherein the gripping member is moveable along the length of the holding device and is to retain an installable component installed within the chassis of the computing device.

2. The holding device as claimed in claim 1, wherein the first arm is to move in a plane which is offset with respect to another plane in which the second arm is to move.

3. The holding device as claimed in claim 1, wherein the tracking section extend s along a planar surface of the first arm.

4. The holding device as claimed in claim 3, wherein the second arm comprises a notched element, wherein the notched element is to engage with the tracking section to couple the second arm with the first arm.

5. The holding device as claimed in claim 1, wherein the first engaging portion and the second engaging portion further comprise a plurality of through holes to couple the holding device to the chassis of the computing device.

6. The holding device as claimed in claim 1, wherein the installable component is a graphics adapter.

7. The holding device of claim 1, wherein the first arm overlaps a portion of the second arm.

8. The holding device of claim 7, wherein the second arm is arranged between the first arm and the gripping member.

9. The holding device of claim 1, wherein the first channel of the first arm aligns with the second channel of the second arm.

10. The holding device of claim 1, wherein the first channel extends through the first arm to form a longitudinal opening in the first arm.

11. The holding device of claim 10, wherein the second channel extends through the second arm to form a longitudinal opening in the second arm.

12. A holding device comprising:
a longitudinally extending first arm, the first arm including a tracking section that defines a first channel extending through a thickness of the first arm;
a second arm coupled to the first arm, wherein the second arm is to extends and moves in a direction parallel to the first arm, and wherein the second arm includes a set of guide rails defining a second channel extending through a thickness of the second arm to guide movement of the second arm parallel to the first arm;
a first engaging portion at first end of the holding device, wherein the first engaging portion is to attach the first end of the holding device to a chassis of a computing device;
a second engaging portion at second end of the holding device, wherein the second engaging portion is to attach the second end of the holding device to the chassis of the computing device, the second end distal to the first end; and
a gripping member to retain an installable component installed within the chassis of the computing device, wherein the gripping member is to:
detachably couple to the second arm; and
move, when coupled, along the length of the second arm.

13. The holding device as claimed in claim 12, wherein the gripping member is to detachably couple to the first arm.

14. The holding device as claimed in claim 12, wherein the gripping member is U-shaped to accommodate and retain the installable component.

15. The holding device as claimed in claim 12, wherein the second arm comprises a notched element having a neck portion and a top portion, wherein the notched element is to couple the second arm and the first arm, and wherein the notched element is to move within the first channel defined by the tracking section when the second arm moves along the length of the first arm.

16. The holding device as claimed in claim 12, wherein the gripping member further comprises an inner profile, the inner profile to conform to a thickness of the installable component.

17. The holding device as claimed in claim 12, wherein the installable component is a graphics adapter and the gripping member is to securely retain the graphics adapter in the computing device.

18. A computing device comprising:
a chassis;
a graphics adapter installed within the chassis of the computing device; and
a holding device attached to the chassis of the computing device, the holding device comprising:
a longitudinally extending first arm, the first arm including a tracking section that defines a first channel extending through a thickness of the first arm;
a second arm coupled to the first arm, wherein the second arm is to extends and moves in a direction parallel to the first arm, and wherein the second arm includes a set of guide rails defining a second channel extending through a thickness of the second arm to guide movement of the second arm parallel to the first arm; and
a gripping member coupled to the first arm, wherein the gripping member is to retain the graphics adapter within the chassis.

19. The computing device as claimed in claim 18, wherein an inner profile of the gripping member is U-shaped to accommodate to a thickness of the graphics adapter.

* * * * *